Figure 1:
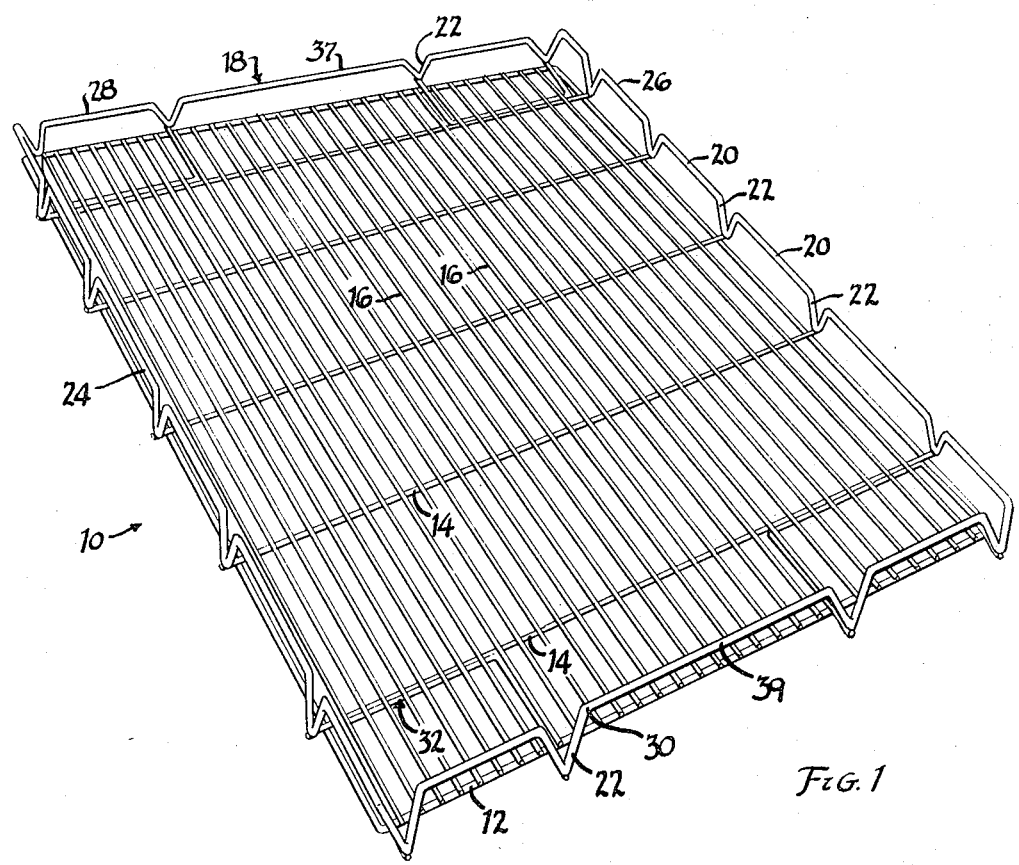

Feb. 21, 1967  R. G. CHESLEY  3,305,125
TRAY

Filed Oct. 20, 1964  2 Sheets-Sheet 1

INVENTOR.
ROBERT G. CHESLEY
BY
WILSON, SETTLE & CRAIG
ATTORNEYS

Feb. 21, 1967  R. G. CHESLEY  3,305,125
TRAY

Filed Oct. 20, 1964  2 Sheets-Sheet 2

INVENTOR.
ROBERT G. CHESLEY
BY
WILSON, SETTLE & CRAIG
ATTORNEYS

United States Patent Office 3,305,125
Patented Feb. 21, 1967

3,305,125
TRAY
Robert G. Chesley, Farmington, Mich., assignor to Chesley Industries, Inc., Farmington, Mich., a corporation of Michigan
Filed Oct. 20, 1964, Ser. No. 405,056
5 Claims. (Cl. 220—19)

The present invention relates to a tray, and more particularly to a wire gridwork tray of the type adapted for shipping baked goods such as breads, pies and cakes.

Bakery trays fabricated of a wire gridwork possess an advantage over sheet metal trays in that they are self-cleaning, relatively inexpensive and rugged. Such trays are used for storing and shipping baked goods. In use of bakery trays, loaded trays are supported on spaced apart angle iron members which are provided in bread trucks, storage rooms and bakery carts. The angle irons form a track along which the trays are slid. An entire line of trays may be loaded onto the angle irons from a single loading point.

One problem encountered in use of such trays is that frequently during loading of the trays onto the angle irons, one tray will slide on top of another tray causing damage to the baked goods. Additionally, such trays are difficult to handle because of the sharp ends of the wire members.

The present invention solves these problems by providing a wall structure which forms a convenient handle for grasping the tray without contacting any of the sharp edges of the ends of the various wires. Additionally, the structure which attaches the wall to the main tray portion acts as a stop, along with the wall structure, to prevent trays from sliding over one another.

It is therefore an object of this invention to provide a wire gridwork tray having a continuous side and end wall structure fabricated from a wire member.

Another object of the invention is to provide an end wall structure which serves to retain goods on the tray and also as a handle structure for lifting the tray.

A further object of the invention is to provide a support structure for the end wall construction which extends between the end wall and the main body of the tray to act, in addition to supporting the end wall, as a stop member to prevent sliding of one tray over another when the trays are loaded onto a track.

A still further object of the invention is to provide a wire wall structure having a plurality of V-shaped portions which serve as recesses to permit stacking of one tray atop another with the V-shaped portions of the upper tray being received in the V-shaped portions of the lower tray whereby the trays are nested together to conserve space and to interlock the stack.

Other objects of this invention will appear in the following description and appended claims, reference being had to the accompanying drawings forming a part of this specification wherein like reference characters designate corresponding parts in the several views.

Figure 2:
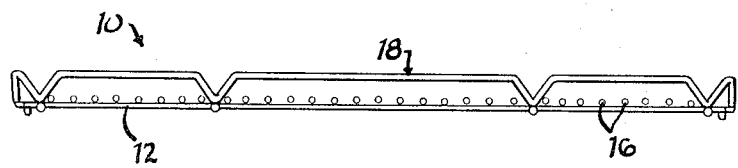
Figure 5:
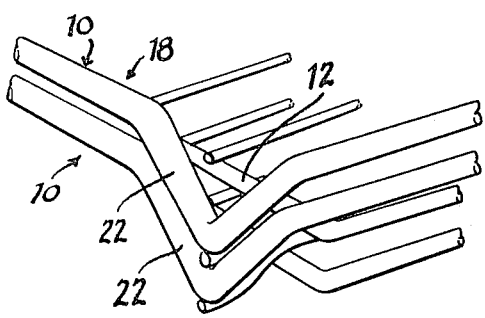
Figure 3:
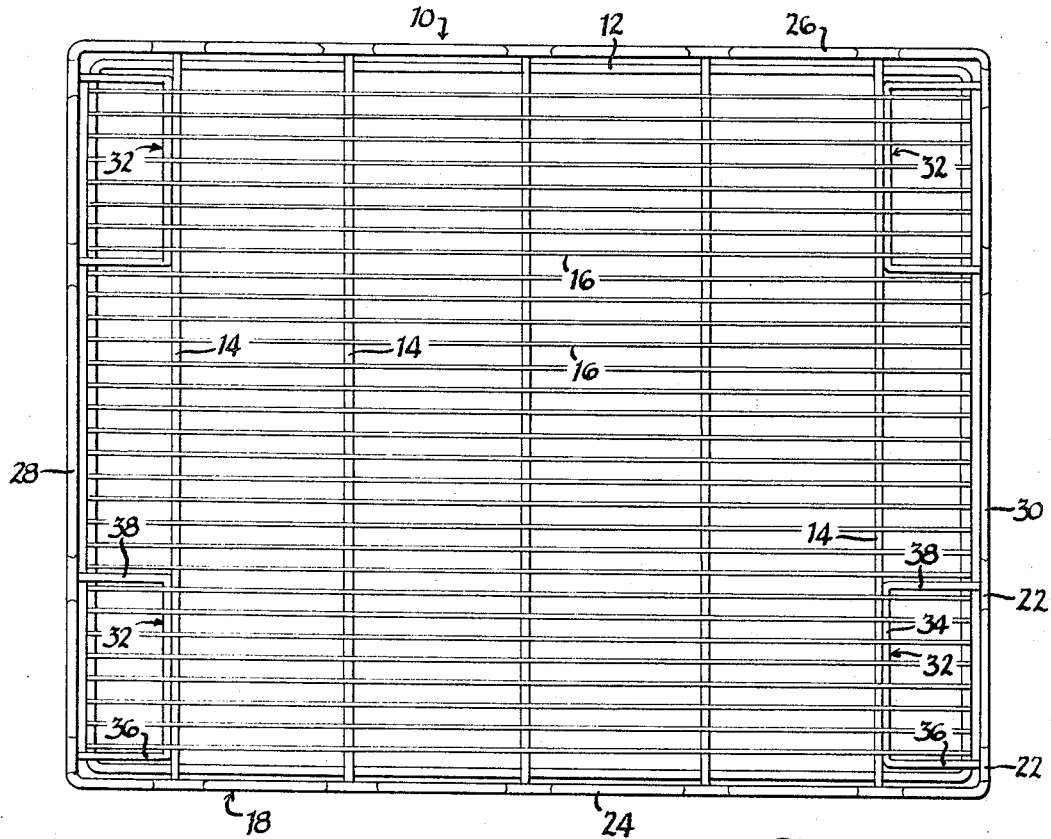
Figure 4:
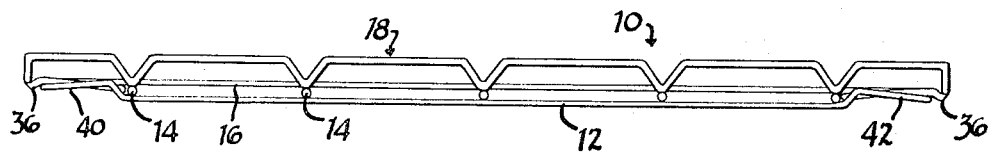
Figure 6:
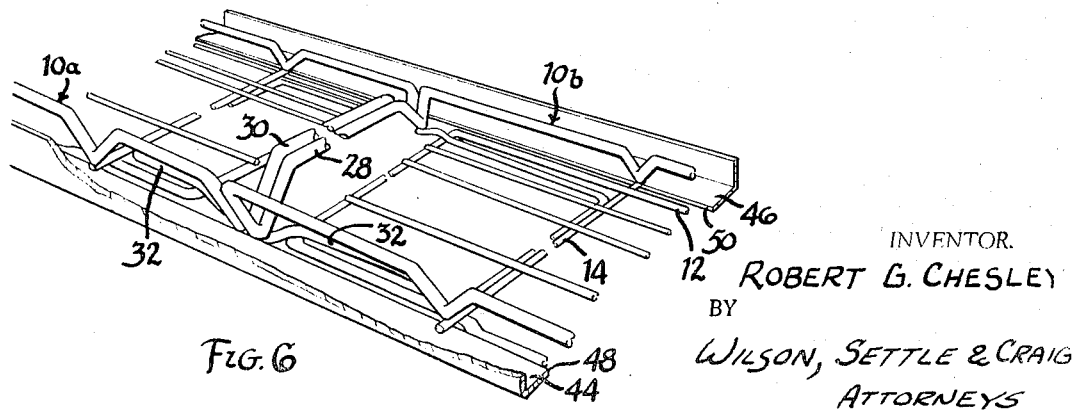

In the drawings:
FIGURE 1 is a perspective view of a tray forming one embodiment of the present invention;
FIGURE 2 is an end elevational view of the tray of FIGURE 1;
FIGURE 3 is a top plan view of the tray of FIGURE 1;
FIGURE 4 is a side elevational view of the tray of FIGURE 1;
FIGURE 5 is a view illustrating the stacked and nested condition of a pair of the trays of FIGURE 1; and
FIGURE 6 is a perspective view illustrating a pair of trays received on a pair of spaced apart angle members illustrating the mode of use of the tray of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURES 1-4, it will be noted that the tray 10 includes a continuous rectangular outer wire frame 12 fabricated of relatively heavy gage wire. A plurality of spaced apart transversely extending support members 14 are secured to the frame 12 as by welding. It will be noted that the ends of the support members 14 extend for a short distance beyond the sides of the frame 12. A plurality of longitudinally extending wires 16 extend between the ends of the frame 12 and are secured to the frame 12 and the support members 14 as by welding. The wires 16 are spaced relatively closely together and form the support surface of the tray. The wires 16 are of smaller diameter than the wire which forms the frame 12 and the support members 14. It will be noted that the ends of the wires 16 do not extend beyond the ends of the frame 12.

A continuous upstanding wire wall 18 is provided around the frame 12. The wall 18 is offset from the sides and ends of the frame 12 to facilitate stacking and nesting of the trays on one another. The wall 18, which is of relatively heavy gage wire, comprises a plurality of straight portions 20 which are interconnected by V-shaped portions 22. The portions 22 are thus offset from the portions 20 and depend therefrom. It will be noted that the V-shaped portions 22 of the side wall sections 24, 26 are equal in number to the number of support members 14 and are aligned with the support members 14 to permit attachment to the ends thereof as by welding. This arrangement also permits nesting of one tray atop another.

The end wall sections 28, 30 are secured in place by means of four U-shaped support members 32, one of which is provided in each corner of the tray. The web 34 of each U-shaped member 32 is parallel and adjacent to the support members 14 nearest to the ends of the tray. The web 34 is secured to the wires 16 as by welding. The legs 36, 38 of the U-shaped members 32 extend longitudinally and are generally parallel to the wires 16. The legs 36, 38 extend a short distance beyond the ends of the frame 12 in the same manner as the support members 14. The legs 36, 38 are secured to the frame 12 as by welding. It will be noted in FIGURE 4 that the end portions 40, 42 of the frame 12 are bent upwardly to be in alignment with the U-shaped members 32 to thereby permit attachment of the U-shaped members to the frame. The V-shaped portions 22 of the end wall sections 28, 30 are in alignment with the legs 36, 38 and are secured to the ends thereof as by welding. It will be noted that relatively long straight portions 37, 39 are provided centrally of the end wall sections 28, 30. The portions 37, 39 serve as handles for lifting the tray.

Again referring to FIGURE 4, it will be noted that the ends of the legs 36, 38 are bent downwardly to be in the same plane as the main portion of the frame 12. This permits the ends of the tray to contact the support surface upon which the tray is set to provide stability and thereby prevent any tendency of the tray to rock. The downturned end portions also permit nesting of an upper tray in the V-shaped notches of a lower tray.

Nesting of the trays is best illustrated in FIGURE 5. As will be there noted, when several trays 10 are stacked, the convex outer portion of the V-shaped portions 22 of the upper tray are received in the concave inner surface of the V-shaped portions 22 of a lower tray to thus conserve space and interlock the trays to prevent lateral shifting thereof. In this connection, it is important to note that the wall 18 must be offset from the frame 12 as shown in order to permit the desired nesting.

FIGURE 6 illustrates the normal use of the trays for transporting or storing baked goods. The trays may, for example, be loaded onto a delivery truck. Such trucks are provided with rows of spaced apart angles which extend longitudinally of the truck interior. The delivery men may load and unload the truck from the rear. An illustrative pair of angles 44, 46 are illustrated in FIGURE 6. The angles 44, 46 each have one leg extending vertically and the other leg extending horizontally to form a support surface for the tray 10. The angles are spaced so that the inner edges 48, 50 are spaced apart a distance slightly greater than the width of the frame 12. As a consequence, only the ends of the support members 14 ride on the angles. This arrangement minimizes the friction between the trays and the angles to permit easy sliding of the trays along the angles. It will be noted that the forward tray 10a is in abutment with the rearward tray 10b. An entire line of trays may be loaded onto the angles 44, 46 by successive additions of trays to the rear of the angles and sliding of the entire line forwardly.

When the trays are loaded in this manner, the end wall section 28 of the rearward tray 10b cannot pass beneath the end wall section 30 of the forward tray 10a because the U-shaped members 32 act as stops to prevent this from occurring. In the past, difficulty has been encountered in such tray constructions in that one tray will slide over another one and thus damage the goods on the trays. It will also be appreciated that the end wall sections 28, 30 serve as convenient handles for lifting the tray 10. If the end wall section were not present, it would be necessary to grasp the main body of the tray. The ends of the wire 16 are usually relatively sharp and can cut or scratch the worker's hand.

Having thus described my invention, I claim:

1. A tray comprising a generally rectangular gridwork for supporting articles, said wire gridwork including spaced apart transverse wire elements which extend for a short distance beyond the sides of the gridwork and spaced apart longitudinal wire elements which extend for a short distance beyond the ends of the gridwork, an upstanding wire wall surrounding the gridwork, said wall having a plurality of downwardly depending portions, each of said downwardly depending portions being in alignment with one of the outer ends of said spaced apart transverse and longitudinal wire elements, said downwardly depending portions being attached to the ends of the respective wire elements to secure the wall in place, whereby a plurality of trays may be stacked on one another with the downwardly depending portions of an upper tray received in the like portions of a lower tray.

2. A tray comprising a wire gridwork for supporting articles, said wire gridwork including spaced apart transverse wire elements which extend for a short distance beyond the sides of the gridwork and spaced apart longitudinal wire elements which extend for a short distance beyond the ends of the gridwork, an upstanding wall formed of a single strand of wire surrounding the gridwork, each end section of the wall having a central straight portion to serve as a handle, said wall having spaced apart downwardly offset portions, each of said offset portions being in alignment with one of the other ends of said spaced apart transverse and longitudinal wire elements, said offset portions being attached to the ends of the respective wire elements to secure the wall in place whereby a plurality of trays may be stacked on one another with the offset portions of an upper tray received in the like portions of the lower tray.

3. A tray comprising a wire gridwork for supporting articles, said wire gridwork including spaced apart transverse wire support elements of relatively large diameter, a plurality of longitudinally extending spaced apart wire elements secured to said transverse wire elements, said longitudinal elements being of a smaller diameter than the transverse elements, some of said transverse elements extending for a short distance beyond the sides of the gridwork, second longitudinal wire elements of greater diameter than said first longitudinal wire elements, said second longitudinal wire elements extending for a short distance beyond the ends of the gridwork, an upstanding wall formed of wire strand surrounding the gridwork, said wall having a plurality of downwardly depending portions, each of said downwardly depending portions being in alignment with one of the outer ends of said spaced apart transverse support elements and said second longitudinal wire elements, said downwardly depending portions being attached to the ends of respective wire elements to secure the wall in place, whereby a plurality of trays may be stacked on one another with the downwardly depending portions of an upper tray received in the like portions of the lower tray.

4. A tray comprising a wire gridwork for supporting articles, said wire gridwork including spaced apart transverse wire support elements of relatively large diameter which extend a short distance beyond the sides of the gridwork and spaced apart longitudinal wire elements of smaller diameter secured to the transverse wire elements, a wire U-shaped support member having a pair of longitudinally extending legs provided in each corner of the gridwork, said U-shaped member being formed of wire of greater diameter than the longitudinally extending wire elements, the legs of said U-shaped member extending for a short distance beyond the ends of the gridwork, an upstanding wire wall formed of a single strand of wire surrounding the gridwork, said wall having a plurality of offset portions, each of said offset portions being in alignment with one of the outer ends of said spaced apart transverse wire elements and the legs of said U-shaped members, said offset portions being attached to the ends of the respective wire elements to secure the wall in place, whereby a plurality of trays may be stacked on one another with the downwardly depending portions of an upper tray received in the like portions of a lower tray.

5. A tray comprising a generally rectangular wire gridwork for supporting articles, said wire gridwork including a frame formed of a single strand of wire, spaced apart transverse wire support elements secured to the upper surface of said frame, said support elements extending for a short distance beyond the sides of the frame, a plurality of spaced apart longitudinal wire elements secured to the upper surface of the transverse support elements and terminating at the ends of the frame, a plurality of spaced apart longitudinally extending support elements secured to the upper surface of the ends of the frame, each end of the frame being offset upwardly to receive the longitudinally extending wire elements, the longitudinal support elements extending for a short distance beyond the ends of the frame, the outer ends of said support elements being turned downwardly to be in the same plane as the main portion of the frame, an upstanding wall formed of a single strand of wires surrounding the gridwork, said wall having a plurality of downwardly depending portions, each of said downwardly depending portions being in alignment with one of the outer ends of said spaced apart transverse support elements and said spaced apart longitudinal support elements, said downwardly depending portions being attached to the ends of the respective wire elements to secure the wall in place, whereby a plurality of trays may be stacked on one another with the downwardly depending portions of an upper tray received in the like portions of a lower tray.

References Cited by the Examiner

UNITED STATES PATENTS

| | | | |
|---|---|---|---|
| 2,736,453 | 4/1956 | Russell | 220—97 X |
| 2,896,549 | 7/1959 | Swanson | 220—19 X |
| 3,038,630 | 6/1962 | Clark | 220—97 X |

FOREIGN PATENTS

| | | |
|---|---|---|
| 859,774 | 1/1961 | Great Britain. |

THERON E. CONDON, *Primary Examiner.*

GEORGE E. LOWRANCE, *Assistant Examiner.*